(12) United States Patent
Uphues et al.

(10) Patent No.: US 7,261,517 B2
(45) Date of Patent: Aug. 28, 2007

(54) DEVICE FOR ADJUSTING A ROTOR BLADE OF A WIND ENERGY TURBINE

(75) Inventors: Ulrich Uphues, Hannover (DE); Patrik Achenbach, Rheine (DE); Martin Von Mutius, Salzbergen (DE)

(73) Assignee: General Electric Company, Schenectady, NY (US)

( * ) Notice: Subject to any disclaimer, the term of this patent is extended or adjusted under 35 U.S.C. 154(b) by 80 days.

(21) Appl. No.: 10/512,604

(22) PCT Filed: Apr. 28, 2003

(86) PCT No.: PCT/EP03/04416

§ 371 (c)(1),
(2), (4) Date: May 5, 2005

(87) PCT Pub. No.: WO03/091570

PCT Pub. Date: Nov. 6, 2003

(65) Prior Publication Data

US 2005/0175456 A1   Aug. 11, 2005

(30) Foreign Application Priority Data

Apr. 26, 2002   (DE) ................................. 102 18 677

(51) Int. Cl.
*F03D 7/04*   (2006.01)

(52) U.S. Cl. ....................... 416/153; 416/155; 416/159
(58) Field of Classification Search ................ 416/153, 416/155, 159, 160, 169 R
See application file for complete search history.

(56) References Cited

U.S. PATENT DOCUMENTS 4,462,753 A * 7/1984 Harner et al. .................. 416/48
6,428,274 B1 * 8/2002 Hehenberger ............... 416/153
6,609,889 B1 * 8/2003 Vilsboll ........................ 416/1

FOREIGN PATENT DOCUMENTS

DE          019720025 A1 * 10/1997

* cited by examiner

*Primary Examiner*—Edward K. Look
*Assistant Examiner*—Nathan Wiehe
(74) *Attorney, Agent, or Firm*—Blakely, Sokoloff, Taylor & Zafman LLP

(57) ABSTRACT

The device for adjusting a rotor blade of a wind energy turbine is provided with a driving device (12) for driving an adjusting element (24) for selectably rotating the rotor blade (26) in both directions about its longitudinal axis (28), an energy storage unit (30) and a free-running means (32) adapted to be selectively activated, said free-running means (32), in its activated state, allowing rotation of the rotor blade (26) by means of energy stored in the energy storage unit (30) only in one of the two directions up to a desired rotational position.

17 Claims, 1 Drawing Sheet

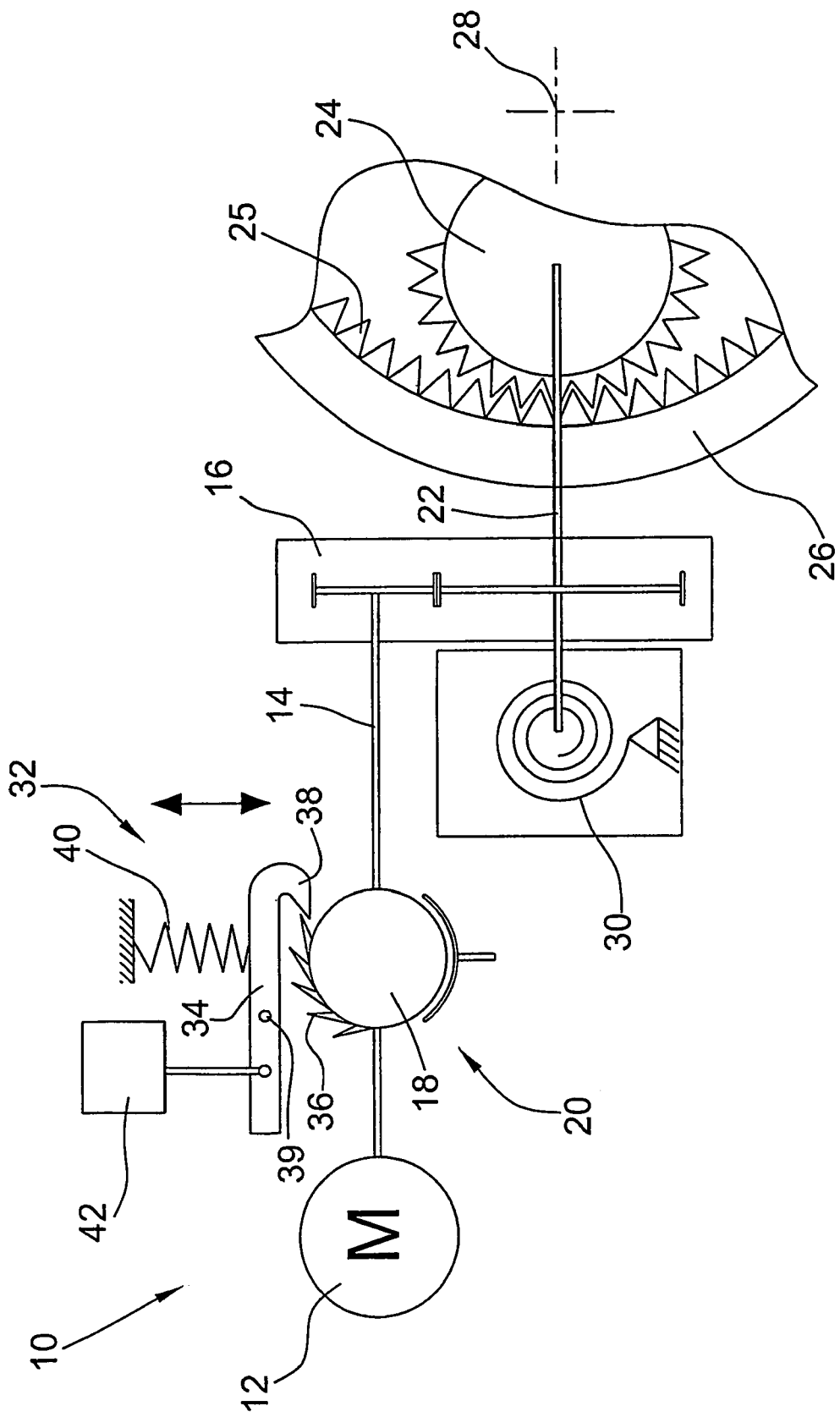

DEVICE FOR ADJUSTING A ROTOR BLADE OF A WIND ENERGY TURBINE

CROSS-REFERENCE TO OTHER APPLICATIONS

This application is a National Phase Application of International Application No. PCT/EP03/04416, filed Apr. 28, 2003, which claims priority from German Patent Application No. 102 18 677.4, filed Apr. 26, 2002.

BACKGROUND OF THE INVENTION

1. Field of the Invention

The invention relates to a device for adjusting a rotor blade of a wind energy turbine. In particular, the invention relates to a device for adjusting (rotating) a rotor blade of a wind energy turbine into a desired rotational position (rotor blade location) without the rotor blade being capable of rotating back in particular, the rotor blade can be locked in the end position or any other rotor position).

2. Description of Related Art

For safety reasons, wind energy turbines require the rotor blades to be capable of being adjusted into a desired (parking) position and locked in said position when a disturbance occurs. For this purpose, systems exist in which the rotor blades are adjusted via their electrical drives, which in cases of emergencies are operated via accumulators or similar electrical energy storages, into the parking position. Those systems are described in DE-A-197 20 025, DE-A-196 44 705, and DE-A-42 21 783. Further, systems are known in which the energy for adjusting the rotor blades into the parking position is provided by mechanical energy storages, such as spring-type storages.

From WO-A-99/23384 and U.S. Pat. No. 6,428,274 a device for adjusting a rotor blade is known in which a locking element directly acts on the driving shaft of a motor for driving the rotor blade.

SUMMARY OF THE INVENTION

It is an object of the invention to provide a device for adjusting a rotor blade of a wind energy turbine, by means of which device, in case of an emergency, the rotor blade can be reliably adjusted into a desired position and locked in said position, if necessary.

According to the invention, this object is achieved with a device for adjusting a rotor blade of a wind energy turbine, the device being provided with:
- a driving device for driving a pitching element for selectably rotating the rotor blade in both directions about its longitudinal axis,
- an energy storage unit, and
- a free-running means adapted to be selectively activated, said free-running means allowing, in its activated state, rotation of the rotor blade by means of energy stored in the energy storage unit only in one of the two directions of rotation up to a desired rotational position.

According to the invention, the device comprises a free-running means adapted to be selectively activated which, e.g. in case of an emergency, is actively or passively connected (in the latter case as a fail-safe system) such that the rotor blade is rotatable by means of the energy from an energy storage only in one direction of rotation into the desired (parking) position. In each rotating position backward rotation of the rotor blade is inhibited since the free-running means produces a direction-selective non-positive connection between the rotor blade or an element directly or indirectly connected with the rotor blade, and the locking element. The free-running element is e.g. configured as a ratchet comprising a toothed element the toothing of which meshes with a locking pawl or a similar locking element. The toothed element may in particular be a brake disk of a locking brake of the rotor blade adjusting mechanism.

The free-running means prevents the rotor blade, once it has assumed the (parking) position or any other position, from being rotated backwards. Thus adjusting moments applied on the rotor blade by the wind or mass forces do not lead to backward rotation of the rotor blade.

In the invention a mechanical energy storage, e.g. a spring-type storage and in particular a coil spring-type storage, can advantageously be used, said storage being driven by a driving unit. The free-running means appropriately engages the more rapidly rotating (drive or driven) shaft of a gear which is normally provided in rotor blade adjusting systems. The gear can be configured e.g. as a toothed gear and/or a belt drive.

Generally, the free-running means comprises a first element adapted to be movable in two opposite directions, in particular directions of rotation, and a second element adapted to be placed in and out of engagement with the first element, wherein the second element, when in engagement with the first element, allows the first element to be moved only in one of its two directions. For reasons of safety it is preferred that the second element is biased into the position, in which it is in engagement with the first element, by means of a biasing element and is adapted to be moved into the out-of-engagement position against the biasing force by means of an actuator. Thus, in case of energy failure, activating the free-running means does not require any electrical energy since the automatic deactivation of the actuator alone, which occurs in the case of energy failure, activates the free-running means.

The advantages of the device according to the invention can be summarized as follows:
- the rotor blade can be fixed within the overall adjusting range (applies unrestrictedly to the brake, but only restrictedly to the free-running means since the free-running means still allows rotational movement in one direction),
- movement of the rotor blade in the (undesired) direction opposite to the direction of rotation is inhibited during rotation of the rotor blade into the desired position,
- due to a high gear ratio a low retaining force of the free-running means is necessary on the rapidly rotating shaft, which requires a lower constructional expenditure and a less stable and thus more inexpensive structure than in the case of locking the rotor blade directly on the blade bearing,
- the rotor blade is always "retained" in a comparatively low-load parking position (in which the rotor blade assumes a feathered position), whereby the overall wind energy turbine and in particular the tower and the rotor blades are relieved, fail-safe activation is possible.

BRIEF DESCRIPTION OF THE DRAWING

A preferred embodiment of the invention is schematically shown in the drawing.

Hereunder the invention is described in detail with reference to the drawing.

DETAILED DESCRIPTION OF THE INVENTION

In the drawing a rotor blade adjusting mechanism 10 is shown which comprises an electrical driving device 12 which rotatingly drives the drive shaft 14 of a gear 16. This shaft 14 carries the brake disk 18 of a locking brake device 20 configured as a fail-safe, passive or active brake. The driven shaft 22 of the gear 16 drives a gearwheel 24 which meshes with an internal ring gear 25 of a rotor blade 26 which is rotatable about its longitudinal axis 28. Via the gear 16 a mechanical (spring-type) energy storage 30 is supplied. The rotor blade adjusting mechanism 10 is further provided with an end position damper and stop, which is not absolutely necessary for the invention and is thus not shown in the drawing for the sake of clarity of the invention.

The brake disk 18 forms part of a switchable free-running means 32 comprising a locking element 34 which is movable between a locking position and a release position. In its locking position the locking element 34 is in engagement with the brake disk 18 to prevent the latter from rotating in one of the two directions of rotation. In this embodiment the brake disk 18 is therefore provided with a toothing 36 with which meshes a meshing end 38 of the locking element 34 (which is e.g. supported such that it is pivotable about an axis 39) in the locking position. The locking element 34 is biased into the locking position by means of a biasing spring 40 and can be moved out of said locking position and into the release position and maintained in this position with the aid of an actuator 42.

Normally, the locking brake 20 is released, and by driving the drive device 12 the rotor blade 26 can be adjusted into a position suitable for operation of the wind energy turbine. Mechanical energy, which is not supplied to the system, is stored in the energy storage 30, and the free-running means 32 is deactivated, i.e. the locking element 34 is out of engagement with the brake disk 18. In case of emergency, the driving device 12 is switched off so that the rotor blade 26 is rotated into the desired parking position (e.g. the feathered or 90° pitch or negatively feathered pitch) by the energy from the energy storage 30. The free-running means 32 is activated by switching off the actuator 42 so that the locking element 34 automatically meshes with the toothing 36 of the brake disk 18. Due to the sawtooth structure of the brake disk 18 the latter can now rotate only in one direction of rotation, while it is prevented from rotating in the opposite direction of rotation by the locking element 34. Thus the rotor blade 26, too, is rotatable only in one of its two directions of rotation. As soon as the rotor blade 26 has reached its parking position, which is detectable e.g. by sensors and in particular limit switches (not shown), the locking brake 20 is activated and fixes the rotor blade 26 via the brake disk 18. Due to use of the spring-type storage, end position stops which are elastic or damped in any other way should be used in the end positions.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A device for adjusting a rotor blade of a wind energy turbine, comprising
    a driving device for driving an adjusting element for selectably rotating the rotor blade in both directions about its longitudinal axis,
    an energy storage unit, and
    a free-running mechanism adapted to be selectively activated, said free-running mechanism to allow, in its activated state, rotation of the rotor blade by use of energy stored in the energy storage unit only in one of the two directions of rotation up to a desired rotational position, wherein the free-running mechanism is adapted to be selectively activated without electrical energy, wherein the free-running mechanism comprises:
        a first element adapted to be freely movable in two opposite directions; and
        a second element adapted to be placed in and out of engagement with the first element, wherein the second element, when in engagement with the first element, allows the first element to be moved only in one of its two directions, wherein the second element is pivotable about an axis between a locking position and a release position, wherein a meshing end of the second element engages with the first element when in the locking position, wherein the second element is positioned and maintained in the release position with an actuator, and wherein the meshing end automatically engages with the first element when power to the actuator is turned off.

2. The device according to claim 1, wherein the driving device comprises a gear having a drive shaft and a driven shaft connected with the adjusting element, and that the free-running mechanism is arranged at the more rapidly rotatable shaft of the gear.

3. The device according to claim 2, further comprising a locking brake which locks the rotor blade when the predetermined rotational position of the rotor blade has been reached.

4. The device according to claim 3, wherein the locking brake comprises a brake disk, and that the free-running mechanism engages the brake disk.

5. The device according to claim 4, wherein the energy storage unit is a spring-type storage adapted to be operated by the driving device.

6. The device according to claim 5, wherein the gear is a toothed gear or a belt drive.

7. The device according to claim 6, wherein the first element-of the free-running mechanism is a brake disk of a locking brake for locking the rotor blade.

8. The device according to claim 7, wherein the second element is biased into the locking position, in which it is in engagement with the first element, by use of a biasing element and is adapted to be moved into the release position against the biasing force by use of the actuator.

9. The device according to claim 3, wherein the energy storage unit is a spring-type storage adapted to be operated by the driving device.

10. The device according to claim 3, wherein the gear is a toothed gear or a belt drive.

11. The device according to claim 2, wherein the gear is a toothed gear or a belt drive.

12. The device according to claim 1, further comprising a locking brake which locks the rotor blade when the predetermined rotational position of the rotor blade has been reached.

13. The device according to claim 12, wherein the locking brake comprises a brake disk, and that the free-running mechanism engages the brake disk.

14. The device according to claim 13, wherein the energy storage unit is a spring-type storage adapted to be operated by the driving device.

15. The device according to claim 1, wherein the energy storage unit is a spring-type storage adapted to be operated by the driving device.

16. The device according to claim 1, wherein the first element of the free-running means is configured as a brake disk of a locking brake for locking the rotor blade.

17. The device according to claim 16, wherein the second element is biased into the locking position, in which it is in engagement with the first element, via a biasing element and is adapted to be moved into the release position against the biasing force by use of the actuator.

* * * * *